(12) United States Patent
Sceery (10) Patent No.: US 7,384,323 B2
(45) Date of Patent: Jun. 10, 2008

(54) SOUND PRODUCING DEVICE

(76) Inventor: Edward J. Sceery, P.O. Box 6520, Santa Fe, NM (US) 87502

(*) Notice: Subject to any disclaimer, the term of this patent is extended or adjusted under 35 U.S.C. 154(b) by 0 days.

(21) Appl. No.: 11/025,505

(22) Filed: Dec. 28, 2004

(65) Prior Publication Data
US 2005/0142982 A1 Jun. 30, 2005

Related U.S. Application Data

(60) Provisional application No. 60/533,580, filed on Dec. 31, 2003.

(51) Int. Cl.
*A63H 5/00* (2006.01)
*A63H 33/40* (2006.01)
(52) U.S. Cl. ...................... 446/208; 446/202
(58) Field of Classification Search ........ 446/207–209, 446/202, 203; 84/330, 350, 349, 360, 361, 84/362, 363, 364, 375
See application file for complete search history.

(56) References Cited

U.S. PATENT DOCUMENTS

| | | | | |
|---|---|---|---|---|
| 2,276,884 A | * | 3/1942 | Scott | 84/363 |
| 2,407,312 A | * | 9/1946 | Magnus | 84/363 |
| 2,473,210 A | * | 6/1949 | Magnus | 84/363 |
| 3,066,444 A | * | 12/1962 | Dieeckmann | 446/207 |
| 3,183,760 A | * | 5/1965 | Michel | 84/363 |
| 3,928,935 A | * | 12/1975 | Beadles, Jr. | 446/208 |
| 4,850,925 A | * | 7/1989 | Ady | 446/207 |
| 5,975,978 A | * | 11/1999 | Hall | 446/208 |
| 6,921,853 B2 | * | 7/2005 | Taillard | 84/383 A |
| 6,926,578 B1 | * | 8/2005 | Casias et al. | 446/207 |

FOREIGN PATENT DOCUMENTS

WO    WO 200004531 A1 * 1/2000

* cited by examiner

*Primary Examiner*—Eugene Kim
*Assistant Examiner*—Urszula M Cegielnik
(74) *Attorney, Agent, or Firm*—Oritz & Lopez, PLLC (57) ABSTRACT

An air-operated sound producing device includes a main housing including a downwardly curved reed-plate formed thereon with a plurality of variously sized sound channels formed therein, a reed assembly having at least two vibratable reeds formed thereon, and a means to secure the reed assembly over the downwardly curved reed-plate. The reed-plate provides a portion between the sound channels for center support and vibration of the reed. The reed assembly of the sound producing device is vibratable in whole, or in part, over multiple sound channels. The device is particularly suited for the use of thin, relatively wide reeds. Further, the device provides for the adaptation of a variety of interchangeable variously sized reeds produced from a single piece of material. The disclosed novel device can produce a wide variety of unusual and desirable sounds of considerable volume and has applications to hand-held musical instruments, toys, novelty items, and wildlife attraction devices.

22 Claims, 5 Drawing Sheets

SOUND PRODUCING DEVICE

PRIORITY

This is a continuation application claiming the benefit of provisional patent application Ser. No. 60/533,580, entitled "Multiple air channel sound device," which was filed with the United States Patent and Trademark Office on Dec. 31, 2003.

TECHNICAL FIELD

The embodiments relate to an air-operated, sound-producing device utilizing a vibratable reed and a downwardly curved reed plate. More particularly, the reed-plate of the device includes multiple parallel sound channels. The relatively wide, variously shaped, single-piece reed is vibratable, in whole or in part, over more than one sound channel.

BACKGROUND

Various sound producing devices have been invented in the past and used as the sound producing portion of wind musical instruments, toys, novelty items, and wildlife attraction devices.

As can be seen in the art, a great majority of such sound producers are designed from the basic concept of a vibratable reed and a reed-plate of some sort, against which the reed may vibrate. Air blown across the reed from the users' mouth, or an alternate air source, will result in vibration of the reed against a plate. The vibrating reed causes air to vibrate and the resulting sound production. Such sound producing devices have applications in musical instruments, toys, novelty items, wildlife attraction devices, and other similarly related sound producing devices.

In the past, the greatest majority of sound producing devices have relied upon a sound producing portion generally consisting of a single, relatively thin, long, and narrow reed which, with passing air, vibrates against a reed-plate. Furthermore, these devices typically have a single, narrow sound or air channel, which is centrally located on the reed-plate. The reed utilized in most prior art is generally slightly larger in width and length than the air channel and overlaps the sides and distal end of the channel.

Various materials have been utilized in the construction of these sound producing devices including wood, metal, various composite materials, rubber, and plastic. Typical examples of prior sound producing devices can be seen in U.S. Pat. No. 2,590,743, to Wintriss, U.S. Pat. No. 3,802,120, to Erhart, U.S. Pat. No. 2,583,400, to Wade, U.S. Pat. No. 795,493 to Olt, and U.S. Pat. No. 1,721,465 to Myers.

Often, the sound producing portions of these devices are centrally located within the bore of a tubular, body structure. This type of sound producing device is commonly referred to as a "closed reed" device. Air originating from the users mouth, from a bellows, or some alternate source, is passed through a tube and over the reed. In these "closed reed" devices, the reed is not in contact with the mouth of the user during operation. The reed and sound producing portion of these devices are completely surrounded by, and enclosed within, a tube. These tubular structures typically have an air intake, or mouthpiece end, into which air is blown. Air and sound exit the device through the opposite end of the tube. Air passing through the tube and over the reed results in vibration of the reed. The reeds of these devices are most often pre-set to produce a specific sound, although various mechanical means to alter the reed vibration and sounds in closed reed devices have been taught in prior art. Examples of closed reed sound producing devices can be seen in U.S. Pat. No. 3,803,755 to Thompson and to Sceery in U.S. Pat. No. 4,950,201.

An alternate type of sound producing device utilizing a vibrating reed, a reed-plate and an air channel, is often referred to as an "open reed" device. "Open-reed" sound producing devices do not require the addition of a tubular mouthpiece at the air intake end for operation. Control of the reed vibration and the specific sound produced by an "open receded" device is generally dependent upon, air blown over the reed by the user, and direct contact with the mouth, lips and/or the teeth of the user. A typical comparison of sound producers with a tubular mouthpiece, and one without a tubular mouthpiece can be seen by viewing U.S. Pat. Nos., 795,493, to Ditto, and U.S. Pat. No. 795,493, to Schults. Ditto discloses a duck call, of a "closed reed" type, which has its sound portions enclosed in a tubular portion of the device. Schults shows a relatively similar sound producing device in his invention, but it is lacking a tubular mouthpiece at the air intake end and therefore it would be referred to as an "open-reed" type of sound producer. Common examples of "open reed" musical instruments are the clarinet and saxophone. Various game calls, used to attract wildlife, have a similar basic configuration of a reed vibrating over a plate and utilize an open-reed configuration and a reed which vibrates over a reed plate. The reed plate usually contains a centrally located sound channel.

Another common type of sound producing device utilizes a reed positioned between two opposing reed-plates. Each plate on these devices generally contains a single, centrally located, sound channel. Air blown through these devices results in vibration of the reed against and between the two plates. This class of sound producing device is commonly referred to as a "semi-open reed" type. The "semi-open reed" sound producing device is somewhat of a hybrid between the "open" and "closed" reed devices. While the reed is not fully exposed as in the "open" reed type, most often neither is it fully enclosed and pre-set to a specific sound, as in a "closed-reed" type. Typically, but not in all cases, the reed vibration and the sounds produced by a "semi-open reed" type of sound device can be manipulated and controlled, to a degree, by pressure applied by the mouth, lips, or teeth of the operator. Examples of this type of sound producing device in which the sounds may be manipulated by pressure can be seen in U.S. Pat. No. 102,799, to Fisher, U.S. Pat. No. 626,827 to Draughon, and U.S. Pat. No. 1,043,123 to McCluskey. A contrasting example of this type of sound producing device can be seen in U.S. Pat. No. 2,825,180, to Dieckman. Dieckman, while using a similar sound producing mechanism as seen in the above cited art, enclose the sound producing portion of the device entirely within a cylindrical tube. The sounds produced by his device must be pre-set during assembly and cannot be altered by the user during operation.

Variations of the above three (3) types of sound producing devices are commonly seen in past art. Some inventors fix or attach a bellows to the air intake-end of their devices as a means to blow air into the tubes and over the reeds. One of the most common and inexpensive methods to introduce a "new" product to the marketplace has been simply to add variously shaped, ornamental tubular portions. These may include, but are not limited to, molded plastic tubes, turned wooden tubes, corrugated tubes, and megaphones. Sound resonating chambers within the tubes and mutes for the air exit end of the devices are also often added to the devices to alter the sounds produced. Often, the exit end of the tube may be modified by removal of various portions or by incorporating interchangeable tubes of various designs in efforts to obtain a wider variety of desirable sounds.

A problem common to all three types of sound producers, "open-reed", "closed-reed", and "semi-open-reed", is a relative limitation in sounds that can be produced, and the volume of sound that can be produced utilizing a single reed and a single air channel. A novel device which incorporates multiple sound channels, and a single reed that is vibratable over multiple sound channels, can produce a greater volume of sound, and it would be useful in all three types of sound producers, i.e., open-reed, semi-open reed, and closed reed.

Another problem encountered in the design of traditional sound producing devices utilizing a single-reed, and single air channel as their basic functioning unit, is in regards to the relative shape of the reed. Typically, and as previously mentioned, most sound producing devices have been designed to utilize, and their design is restricted to facilitate, only a single relatively long, thin vibrating reed over a single sound channel. A thin reed, but relatively wider, and a wider sound channel might be incorporated for greater air flow and volume of sound. However, such a configuration does not function well as a wide sound channel does not provide sufficient support for a relatively thin reed.

Recognizing the limitations of single-unit sound producers, and in efforts to address various problems with these devices, a number of past inventors have disclosed designs that incorporate multiple sound producing portions into a single sound producing device. Convenience to the user, the ability to produce a greater volume of sound, the production of a wider variety of sound, and the production of more desirable tones are among the numerous advantages.

Many quite novel and interesting arrangements of sound producing devices, incorporating multiple sound producing portions, can be seen in a review of art. To one skilled in the art, some of these designs appear quite rudimentary, while others certainly more complex; however, the basic functioning unit, or sound producing portion, and generally common to most of the designs, is the configuration of a single reed which vibrates against a reed-plate, and the reed-plate having a single, centrally located air channel which directs and carries vibrating air and sound from the device.

Early teachings by Testo, U.S. Pat. No. 3,054,216, and Kuhlemeier, in U.S. Pat. No. 742,680, taught that two, single sound producers could simply be aligned in a side-by-side arrangement. Hoeflich in U.S. Pat. No. 2,607,162 taught that a single sound producing device could be constructed with two, side-by-side single reeds, each operating independently of the other and each separate reed vibrating over their respective air channel. Jentzen, in U.S. Pat. No. 2,493,472, disclosed a sound producer which incorporated a single reed with a second backing strip located above the reed and over a single air channel. Burnham, in U.S. Pat. No. 4,612,001, disclosed a device with multiple sound producing portions aligned in a series. Back-to-back sound producing devices, located within a central bore, have been disclosed in the designs of: Wilson, in U.S. Pat. No. 2,385,752, Beadles in U.S. Pat. No. 3,928,935, and Wade, in U.S. Pat. No. 2,583,400. Gambino taught the arrangement of placing sound producing portions in the two opposing ends of a single, tubular body in U.S. Pat. No. 4,211,031. The Gambino device was operable from either end. Craft in U.S. Pat. No. 3,075,317 disclosed a single reed sound producing device enclosed within a tube. The reed was secured at its center, which allowed the two opposite ends to each vibrate over separate, in line, plates produced from a single piece of material. The device was also operable and would produce sound from air passing in either direction through the tube.

Increasing the number of sound producing portions to an even greater extent and placing a plurality of single-reed sound producers in a single tubular device, Tierce in U.S. Pat. No. 2,488,838, taught the use of a multi-faced mandrel and multiple reeds, and disclosed through his illustrations, an arrangement of four, single-piece, vibrating reed sound portions incorporated into his design. The above disclosed designs are certainly all capable of producing a greater variety of sounds and, to each individual inventor, a subjectively more desirable sound, as well as, other benefits to the user. A characteristic common to all of the above mentioned sound producing devices, irrespective of the configuration or number of reeds, is that each device includes, as the basic sound producing portion, a single reed vibrating over a single sound channel. Lacking in all of the above mentioned disclosures is a single reed that is vibratable over multiple sound channels.

A problem generally encountered when incorporating multiple sound producing portions in a single device is increased costs due to the additional number of parts required and additional labor requirements for assembling, tuning, cleaning, and general maintenance of the device. As examples, the Testo and Burnham designs require two complete, separate and functional sound producing portions, and the Tierce design requires a plurality of separate reeds, reed plates, and a plurality of portions for reed securement. In addition, the utilization of multiple, independently vibrating reeds often presents problems with alignment and securement of the individual reeds. In the Hoeflich design, a minimum of parts was noted as a benefit; however, the adaptation of different reeds in the Hoeflich design appears restricted to the manufacturing process and requires the construction of costly plastic injection molds. Furthermore, Hoeflich does not teach a device with a single reed vibrating over multiple sound channels.

It would a benefit to provide a novel sound producing device that had multiple sound producing portions and one which was capable of producing a wide variety of unique and desirable sounds with a minimum number of parts, and a minimum of time and labor for assembly, reed alignment, tuning, and maintenance. Furthermore, it would be a benefit if the novel sound producing device contained a relatively inexpensive reed, which in part, is vibratable over multiple air channels, and in part with variously shaped tongues, operated over separate air channels, and one that could be changed and adjusted with relative ease by the operator.

Disclosed in the present embodiment is a sound producing device which contains a downwardly curving, reed-plate surface incorporating multiple sound channels, and a single reed which is operable, in whole or in part, depending on the particular sound desired, over multiple sound channels. The single-piece reed can be modified in shape, by altering the size and shape of the reed and reed tongues, providing a novel device that has, without modifications to the reed plate, the ability to produce a wide range of unique and desirable sounds. Furthermore, and of considerable importance, the embodiment can be variously sized and fitted within a tubular air passage, in a "closed-reed" device, and may also be.

Another common problem encountered with an air operated sound producer utilizing a thin vibrating reed is a tendency of the reed to stick to the reed-plate. This sticking is typically a result of moisture from humid air or from saliva blown from the mouth of the user. Those individuals skilled in the art recognize that this problem is a result of both surface tension of water and to the various sugars and other compounds normally found in saliva. Furthermore, it has been recognized by some modification of the reed-plate or reed provides less contact of the reed with the reed-plate, or directs moisture or saliva away from the reed and/or the reed-plate, would most likely have a tendency to reduce this problem. For example, the incorporation of variously sized grooves, ridges or other modifications made to a reed plate which minimize contact between the vibrating reed and the reed plate will reduce the possibility of sticking. In addition, any modification to such sound producing devices, which prevents introduction of moisture into the device will also reduce the problem. Various "spit collectors" are commonly found on musical instruments to address the introduction of moisture and/or saliva into the devices. It is also commonly known that various alterations at the distal end, or other portions, of the reed-plate that results in air turbulence or a lifting effect on the reed will also tend to reduce this problem.

The specific material used in construction of the reed plate, and the thickness and material of the reed also plays a roll in this reed-sticking problem. A reed made of a material that repels moisture, such as a Teflon material, will have less of a tendency to stick. A relatively thick reed that is tapered and thinner at its vibrating, or distal, end will also reduce this problem. To maintain uniform contact of the reed against the reed-plate and desirable reed vibration, the taper is commonly located on the upper side of the reed. A long, thin, narrow reed, that bends easily, presents more of a problem with sticking than does a shorter, wider reed, or one of the same shape but of thicker or more rigid material. A relatively wider reed, with less of a tendency to bend, more easily overcomes the problem of sticking as a result of surface tension of water and the problems caused by saliva. Furthermore, it is known that providing a long narrow reed with some mechanical means of support at a point along it's free, vibratory portion will also reduce the possibility of reed sticking.

In accordance with feature of the embodiments, a sound producing device is capable of utilizing a wide, relatively thin reed, vibrating over multiple air channels or partially over multiple air channels, provides more strength and rigidity than does the typical narrow, long, and thin reed, and thereby improves the function and vibration of the reed by reducing the potential for reed sticking. In the present embodiment, the utilization of a single wide reed, which covers multiple sound channels towards its proximal end and incorporates multiple reed tongues at its distal, vibratory end, provides additional reed support at the vibratory ends of the reed and improves the reed function and also reduces the problem of reed sticking.

SUMMARY OF THE EMBODIMENTS

A new and improved sound producing device is herein described that is particularly suited to novel musical instruments, toys, novelty items, wildlife attraction devices and other similarly related sound producing devices.

According to features of the embodiments, a sound producing device can be configured and utilized in a "semi-open reed" or an "open-reed" type of sound producing device. Further, it may be incorporated into sound producing devices utilizing variously shaped tubes, mouthpieces, bellows, megaphones and the like.

The sound producing device, in "open-reed" and "semi-open reed" configurations, can produce both relatively high pitched sounds and also low-pitched coarse sounds.

When pressure is appropriately placed on the reed so that only the reed tongues vibrate, high-pitched, relatively smooth sounds are produced. In it's "open-reed" configuration and fitted with a reed with multiple tongues, pressure may be applied by the mouth to allow only a single reed tongue to vibrate which produces a single, relatively smooth sound. By changing pressure on the reed, two or more reed tongues may be made to vibrate which increases the coarseness of the sound and maintains the high pitches of the notes produces.

By changing mouth pressure toward the proximal end of the reed, and nearly completely removing all pressure on the reed, very desirable low coarse pitch sounds are produced as the wide, proximal end of the reed vibrates over multiple sound channels.

When used in a "closed reed" device, the reeds may be pre-set to produce the specific most desirable sounds or mechanical means may be incorporated into the device and utilized to alter the portions of the reed which vibrate during operation.

In accordance with features of the embodiment, a body is formed with a downward curving reed-plate. The reed-plate is fitted with at least one reeds that vibrate over two or more sound channels. A single, relatively wide reed is fashioned of a size that is vibratable, in whole or in part, over multiple sound channels. The body of the sound producing device includes a groove capable of accepting a suitably sized rubber wedge for securing the at least one reed in position; although other means for reed securement may be utilized and are within the scope of the embodiments.

In accordance with another feature of the embodiment, a sound producing device is provided that is capable of producing considerable volume, unique sounds, and improved tones. The body of the device is preferably constructed of injection molded plastic, however, it alternatively can be made of wood, metal, rubber or other suitable material. The body of the device includes a downwardly curving reed plate, two or more sound channels, and a slot over the reed channels which can accept a wedge for reed securement, although alternate means for reed securement may be utilized.

In accordance with another feature of the embodiment, the device includes a reed that is relatively wide in relation to the length of the reed-plate. The reed, in whole or in part, is vibratable over multiple sound channels. In a preferred embodiment, the single, relatively wide reed is of a width that completely covers and is vibratable over more than one sound channels.

In an alternate embodiment, the reed may be modified so that the full width of the proximal portions of the reed is vibratable over multiple sound channels, while the distal, or free, end of the reed may be modified to include variously shaped tongues which are vibratable over their respective sound channels, The specific shape and length of the tongues influence the sounds, which may be produced. A wide variety of differently shaped reeds can be fitted to this sound producing device which provides the maker a means to produce a wide variety of different and desirable sounds with a minimum of tooling, parts, and other related investment costs.

Another feature is to provide a sound producing device, with a reed plate and sound channels that are capable of supporting relatively wide, thin vibratable reeds. The preferred reed material in the disclosed sound producing device is a thin, flexible plastic such as Mylar; although rubber, wood, brass, steel, or any other suitable material may be utilized. In the present device, intermediate portions of the reed-plate, between the sound channels provide support for the effective use of wide, relatively thin reeds.

A further feature is to provide a sound producing device that may be variously sized and modified so that its utility extends to devices of "closed-reed," "semi-open reed" and "open reed" configurations.

In accordance with another feature of the embodiments, the sound producing device can be utilized with a wide variety of attachments. Such attachments can include, but not limit the device to, the attachment of a wide variety of tubular structures such as corrugated tubing, turned wooden tubes, molded plastic tubes, and the like. The device can also be fitted with megaphones, resonating chambers for sound quality and amplification, and bellows or other means for introducing air.

In accordance with yet another feature of the embodiments, a sound producing device utilizes a vibratable reed being of a shape to minimize the possibility of sticking and that is also relatively inexpensive to manufacture and easy for the operator of the device to change, adjust, clean, and tune.

Another feature of the embodiments is to provide a sound producing device with a minimum number of parts that is relatively easy and inexpensive to manufacture and easy TO assemble and disassemble.

DETAILED DESCRIPTION OF THE PREFERRED EMBODIMENT

Figure 1:
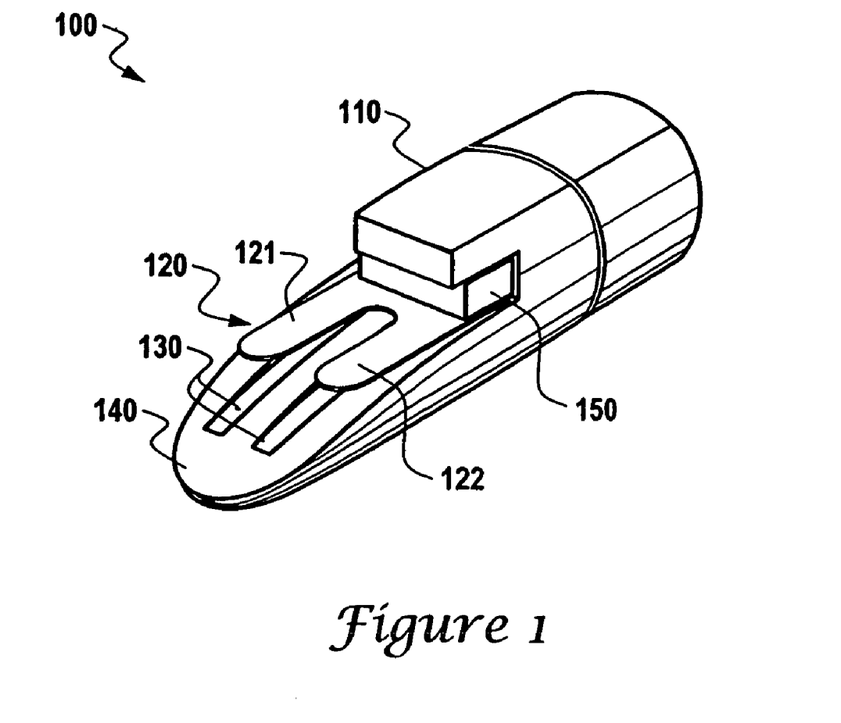
FIG. 1 is a right-front perspective illustration of a sound producing device in accordance with an embodiment of the present embodiment.

Referring to FIG. 1, a right-front perspective of sound producing device 100 in accordance with the preferred embodiment is illustrated. The sound producing device 100 includes a housing 110 having more than one air channel 130 formed a downward curving reed plate 140, a multiple reed assembly 120 and a reed holding block 150. As shown in FIG. 1, the multiple reed assembly 120 has two reeds, 121 and 122.

Figure 2:
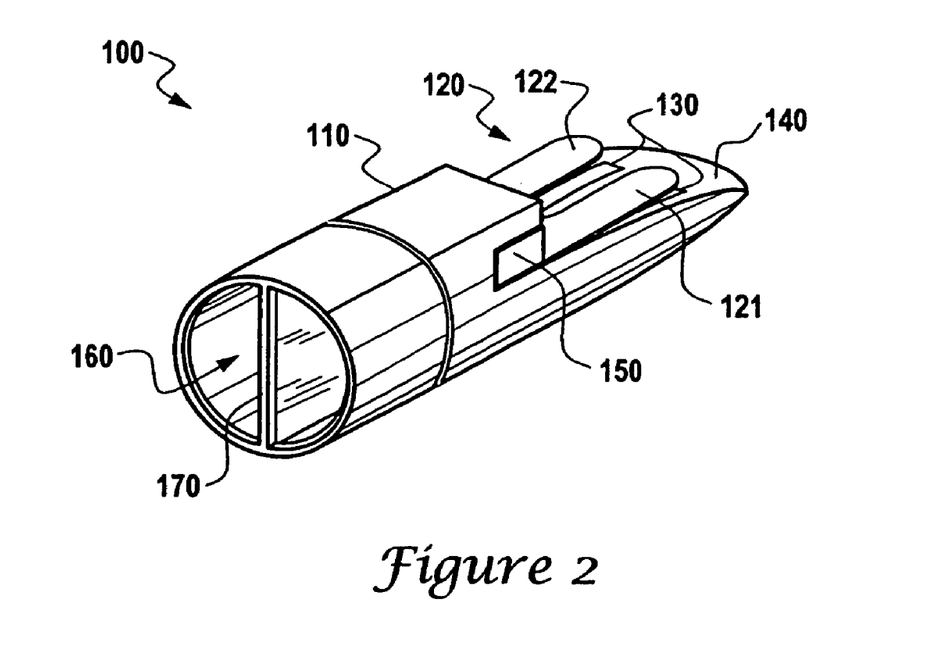
FIG. 2 is a left-rear perspective illustration of the sound producing device shown in FIG. 1.

Referring to FIG. 2, a left-rear perspective illustration of the sound producing device 100 is shown. From this perspective, the noise/air exit area 160 of the device 100 is shown. The exit area 160 is shown with a partition 170. The partition 170 can be used between air passages at exit area 160 associated with each air channels 130 and to better isolate sound as it exits the sound producing device 100.

Figure 3:
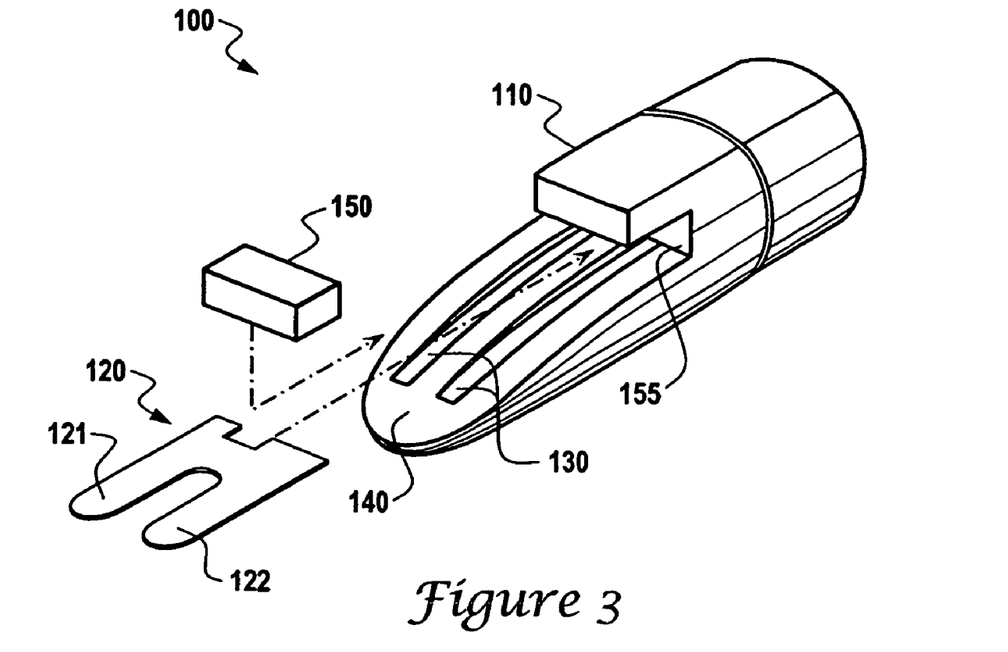
FIG. 3 is the sound producing device of FIG. 1 showing a one-piece multiple vibrator reed and a holding block removed from the main housing.

Referring to FIG. 3, the sound producing device 100 of FIGS. 1 and 2 is shown disassembled. The reed assembly 120 and reed retainer 150 are shown removed from the main housing 110. The main housing 110 has formed thereon the air channels 130, downward curving plate 140 and reed receiving and retaining area 155, which appears as a notch formed in the housing wherein the reed retainer snuggly holds the reed in the housing and over the downward curving reed plate 140.

Figure 4:
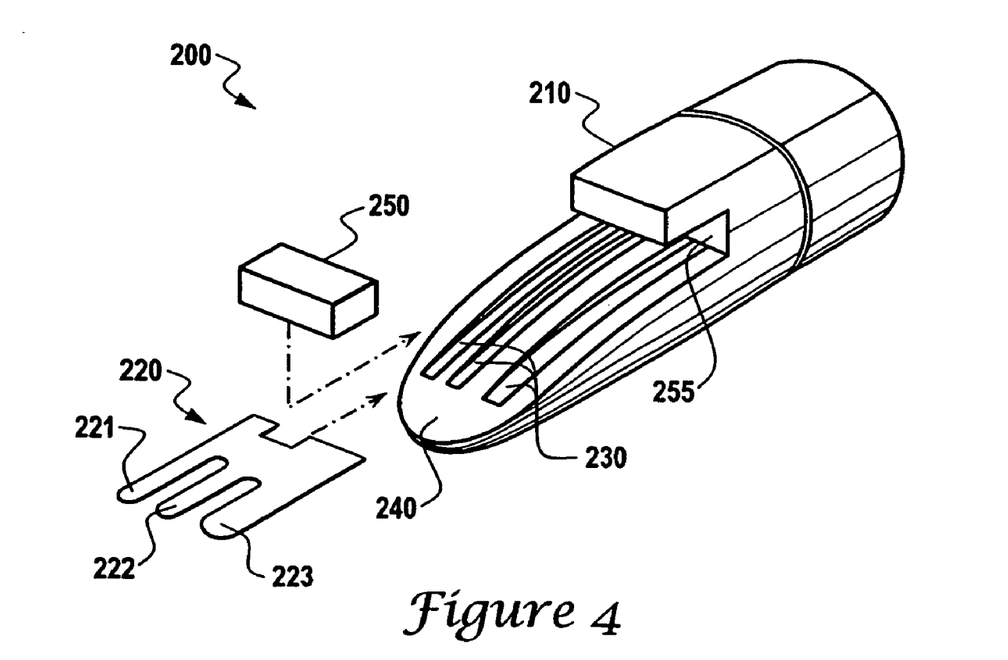
FIG. 4 is a right-front perspective illustration of a sound producing device in accordance with another feature of the embodiment, wherein shown is a multiple vibrator reed having three separate and distinct vibrators and associated air channels formed within a downward curving reed plate.

Referring to FIG. 4, a right-front perspective illustration of a sound producing device 200 in accordance with additional features of the preferred embodiment is shown, wherein a multiple vibrator reed assembly 220 has three separate and distinct vibrators 221-223 and associated air channels 230 formed within a downward curving reed plate 240. The multi vibrator reed assembly 230 is again held onto the housing 210 in reed receiving area 255 by reed retainer 250.

Figure 5:
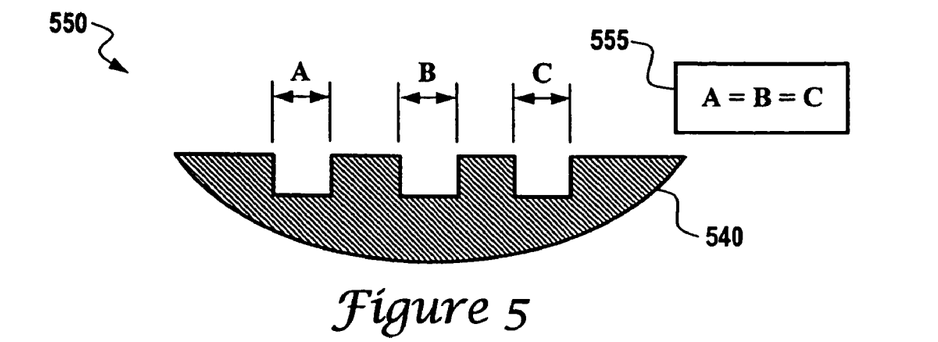
FIG. 5 is a front cut-away view of a reed plate illustrating three air channels of equal size, equally spaced.

Referring to FIG. 5, shown is a front cut-away view 550 of a reed plate 540 illustrating three air channels A, B and C of equal size as shown mathematically in block 555, and equally spaced.

Figure 6:
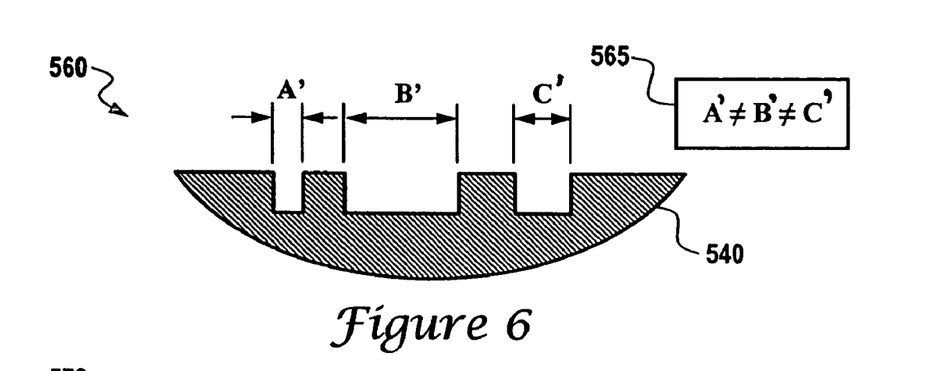
FIG. 6 is a front cut-away view of a reed plate illustrating three air channels of varying size, unequally spaced.

Referring to FIG. 6, illustrated is a front cut-away view 560 of a reed plate 540 illustrating three air channels A', B' and C' of varying size as shown mathematically in block 565, unequally spaced.

Figure 7:
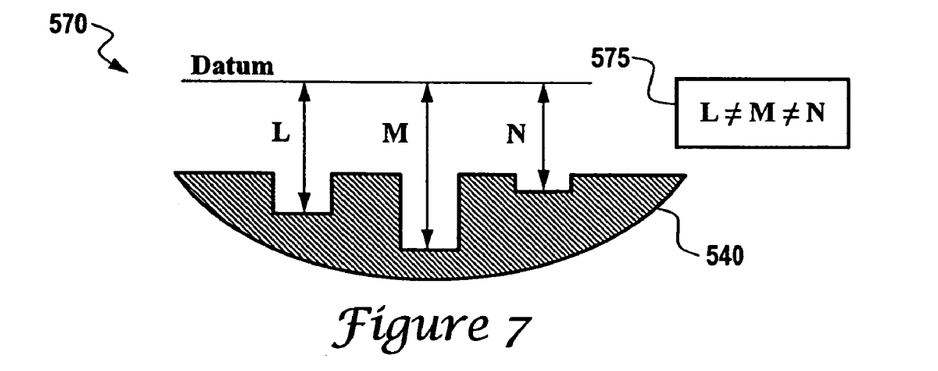
FIG. 7 is a front cut-away view of a reed plate illustrating three air channel of equal width, but having unequal depths.

Referring to FIG. 7, illustrated is a front cut-away view 570 of a reed plate 540 illustrating three air channels L, M. N of equal width, but having unequal depths as shown mathematically in block 575.

Figure 8:
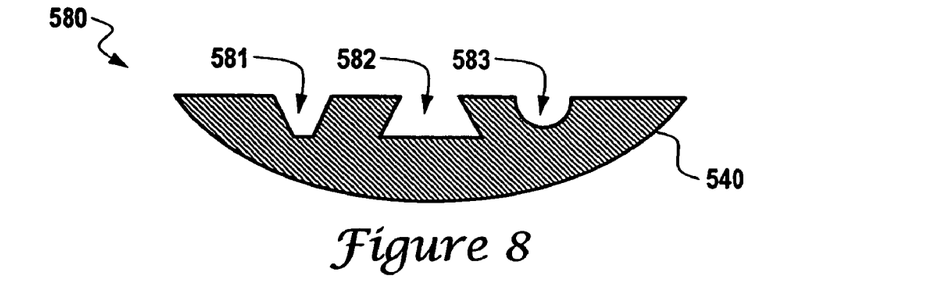
FIG. 8 is a front cut-away view of a reed plate illustrating three air channels of varying shape and size.

Referring to FIG. 8, the drawing shows a front cut-away view 580 of a reed plate 640 illustrating three air channels 581-583 of varying shape and size. Channel 581 is shown in a V-like shape, channel 582 shaped as a trapezoid, and channel 583 in the shape of a half-circle.

Figure 9:
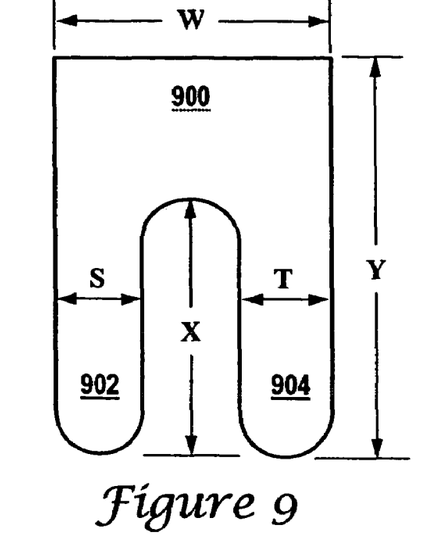
FIG. 9 is a top view of a one-piece multiple reed assembly having two reeds of equal size.
Figure 10:
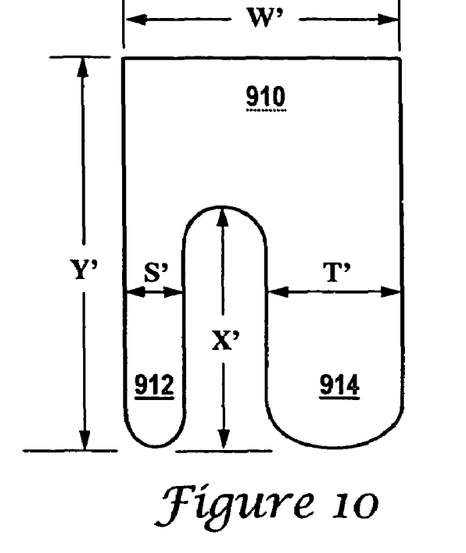
FIG. 10 is a top view of a one-piece multiple reed assembly having two reeds of unequal size.
Figure 11:
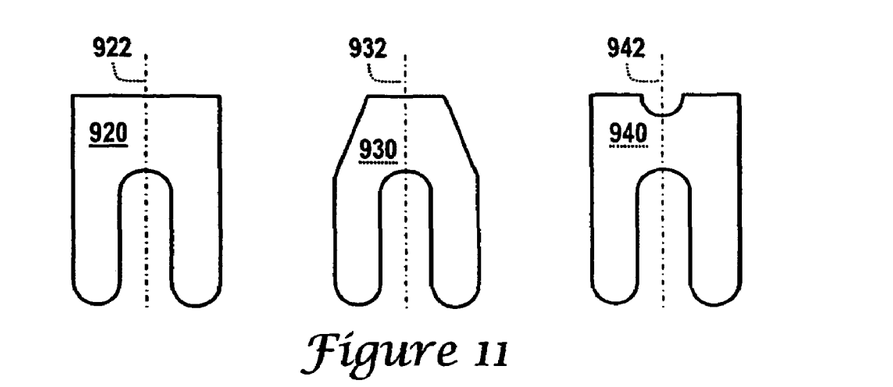
FIG. 11 is a top view of three one-piece multiple reed assemblies having varying retaining ends, two reeds being "keyed" for proper insertion into the reed retention area of the sound producing device housing.
Figure 12:
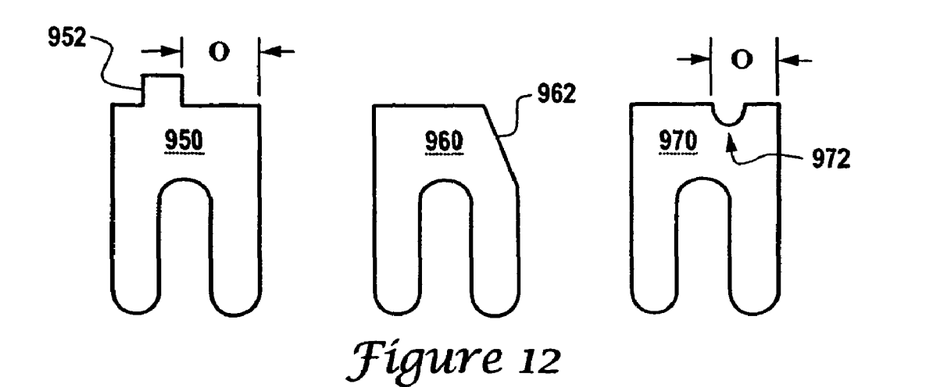
FIG. 12 is a top view of three one-piece multiple reed assemblies having varying retaining ends, the reeds being "keyed" for proper insertion into the reed retention area of the sound producing device housing.

Referring to FIG. 9, a top view of a one-piece multiple reed assembly 900 having two reeds 902 and 904 of equal size is shown. FIG. 10 shows a top view of a one-piece multiple reed assembly 910 having two reeds 912/914 of unequal size. FIG. 11 shows a top view of three one-piece multiple reed assemblies 920, 930, 940, with respective dividing lines 922, 932 and 942. Reeds 930 and 940 are shaped differently at their center point at their respective retaining ends. The equally distributed, varied shapes allow the reeds to be "keyed" for proper insertion into the reed retention area of the sound producing device main housing. The reeds, however, can be flipped for insertion at either surface. FIG. 12 illustrates a top view of three more one-piece multiple reed assemblies 950, 960 and 970 respectively having varying retaining ends 952, 962, 972; however, these reeds are "keyed" wherein proper insertion into the reed retention area of the sound producing device housing also requires that only one side of the reed faces upward and away from the housing.

Figure 13:
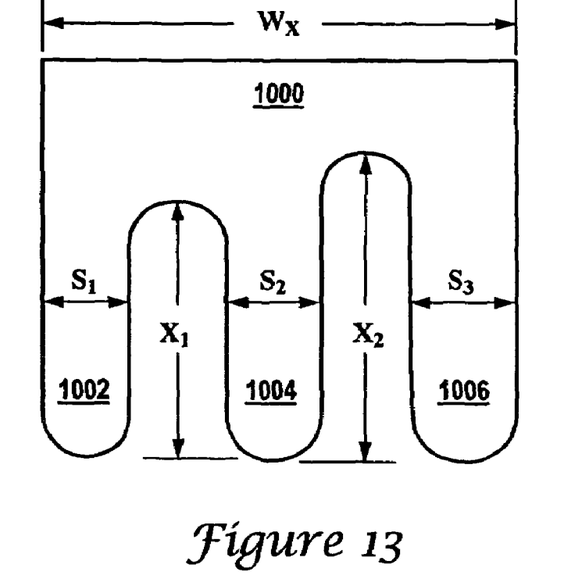
FIG. 13 is a top view of a one-piece multiple reed assembly having three reeds of equal width, but varying in length.
Figure 14:
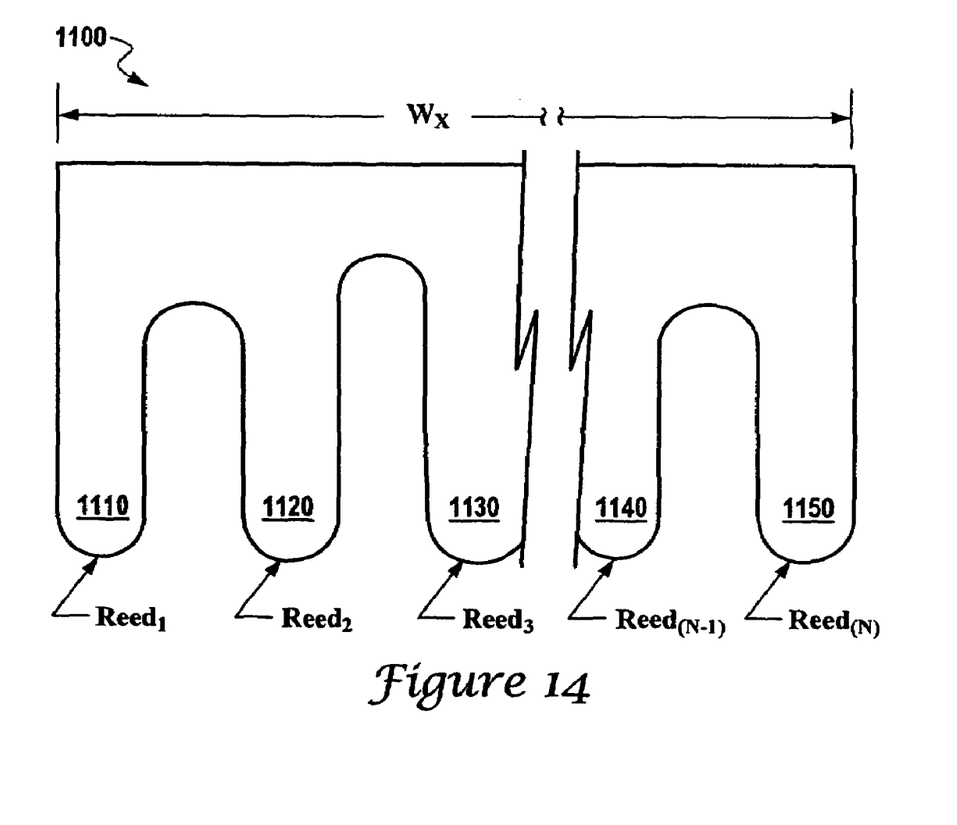
FIG. 14 is a top view of a one-piece multiple reed assembly having more than three reeds.

Referring to FIG. 13, a top view of a one-piece multiple reed assembly 1000 having three reeds 1002, 1004, and 1006 of equal width, but varying in length. FIG. 14 illustrates a top view of a one-piece multiple reed assembly 1100 having more than three reeds 1110, 1120, 1130, 1140 and 1150. FIG. 14 illustrates that more than five reed can be formed from a single reed assembly.

The invention claimed is:

1. An open reed air-operated sound producing device, comprising:
   a main housing comprising a downwardly curved reed-plate, at least two sound channels formed in the reed plate, an exit area, and a reed receiving and retaining area between the downwardly curved reed-plate and the partitioned exit area;
   a multiple reed assembly comprising a single flat and thin material layer comprising at least two vibratable reeds; and
   a reed holding block;
   wherein the sound channels extend from the reed receiving and retaining area and along the downwardly curved surface of the reed plate;
   wherein the multiple reed assembly is aligned to the reed receiving and retaining area such that pressing the vibratable reeds to the surface of the downwardly curved reed plate covers the sound channels; and
   wherein pressing the reed holding block into the reed receiving and retaining area fastens the multiple reed assembly the reed receiving and retaining area.

2. The invention of claim 1 wherein the downward curving reed plate includes at least two air channels of equal size that are equally spaced.

3. The invention of claim 1 wherein the downward curving reed plate includes at least two air channels of varying size that are unequally spaced.

4. The invention of claim 1 wherein the downward curving reed plate includes at least two air channels of equal width and having unequal depths.

5. The invention of claim 1 wherein the downward curving reed plate includes at least two air channels of varying shape and size.

6. The invention of claim 5 wherein the downward curving reed plate includes at least two air channels of varying shape and size including at least one channel in the shape of at least one of: a V-like shape, a trapezoid, a half-circle.

7. The invention of claim 1 wherein the multiple reed assembly includes at least two reeds of equal size.

8. The invention of claim 1 wherein the multiple reed assembly Includes at least two reeds of unequal size.

9. The invention of claim 1 wherein the multiple reed assembly includes at least two reeds having different shapes.

10. The invention of claim 1 wherein the multiple reed assembly is "keyed" for proper insertion into the reed retention area.

11. The invention of claim 1 wherein the multiple reed assembly can be flipped for insertion in the main housing over the downward curving reed plate.

12. The invention of claim 1 wherein the device is used with at least one of:
   hand-held musical instruments, toys, novelty items, and wildlife attraction devices.

13. An open reed air-operated sound producing device, comprising:
   a main housing comprising a downwardly curved reed-plate, at least two sound channels formed in the reed plate, a partitioned exit area having more than one passage formed by partitions and associated with the at least two sound channels, and a reed receiving and retaining area between the downwardly curved reed-plate and the partitioned exit area;
   a multiple reed assembly comprising a single flat and thin material layer comprising at least two vibratable reeds; and
   a reed holding block;
   wherein the sound channels extend from the reed receiving and retaining area and along the downwardly curved surface of the reed plate;
   wherein the multiple reed assembly is aligned to the reed receiving and retaining area such that pressing the vibratable reeds to the surface of the downwardly curved reed plate covers the sound channels; and
   wherein pressing the reed holding block into the reed receiving and retaining area fastens the multiple reed assembly to the reed receiving and retaining area.

14. The invention of claim 13 wherein the downward curving reed plate includes at least two air channels of equal size that are equally spaced.

15. The invention of claim 13 wherein the downward curving reed plate includes at least two air channels of varying size that are unequally spaced.

16. The invention of claim 13 wherein the downward curving reed plate includes at least two air channels of equal width and having unequal depths.

17. The invention of claim 13 wherein the multiple reed assembly includes at least two reeds of equal size.

18. The invention of claim 13 wherein the multiple reed assembly includes at least two reeds of unequal size.

19. The invention of claim 13 wherein the multiple reed assembly includes at least two reeds having different shapes.

20. The invention of claim 13 wherein the multiple reed assembly is "keyed" for proper insertion into the reed retention area.

21. The invention of claim 13 wherein the multiple reed assembly can be flipped for insertion in the main housing over the downward curving reed plate.

22. An open reed air-operated sound producing device, comprising:
   a main housing comprising a downwardly curved reed-plate, two sound channels formed in the reed plate, a partitioned exit area having two passages formed by partitions, each passage associated with one sound channel, and a reed receiving and retaining area between the downwardly curved reed-plate and the partitioned exit area;
   a multiple reed assembly comprising a single flat and thin material layer comprising two vibratable reeds; and
   a reed holding block;
   wherein the sound channels extend from the reed receiving and retaining area and along the downwardly curved surface of the reed plate;
   wherein the multiple reed assembly is aligned to the reed receiving and retaining area such that pressing the vibratable reeds to the surface of the downwardly curved reed plate covers the sound channels; and
   wherein pressing the reed holding block into the reed receiving and retaining area fastens the multiple reed assembly to the reed receiving and retaining area.

* * * * *